340-567 SR
3/2/82 OR 4,318,089

United States Patent [19] [11] 4,318,089
Frankel et al. [45] Mar. 2, 1982

[54] INFRARED DETECTOR SYSTEM

[75] Inventors: Denes E. Frankel, Los Angeles; Robert C. Dobkin, Hillsboro; Barry G. Broome, Glendora, all of Calif.

[73] Assignee: David Frankel, Lynwood, Calif.

[21] Appl. No.: 133,353

[22] Filed: Mar. 24, 1980

[51] Int. Cl.3 .......................... G01J 5/08; G08B 13/18

[52] U.S. Cl. .................................... 340/567; 250/342; 250/353; 340/555; 350/294; 350/299

[58] Field of Search ............... 340/555, 556, 557, 567; 250/338, 342, 353; 350/292, 293, 294, 299

[56] References Cited

U.S. PATENT DOCUMENTS

| | | | |
|---|---|---|---|
| 3,631,434 | 12/1971 | Schwartz | 340/567 |
| 3,803,572 | 4/1974 | Campman | 340/555 |
| 3,839,640 | 10/1974 | Rossin | 250/353 |
| 3,840,868 | 10/1974 | Campman | 340/555 |
| 3,928,843 | 12/1975 | Sprout et al. | 340/567 |
| 3,958,118 | 5/1976 | Schwarz | 340/567 X |
| 3,972,598 | 8/1976 | Kunz | 340/567 X |
| 3,988,726 | 10/1976 | Reiss et al. | 340/567 X |
| 4,024,397 | 5/1977 | Weiner | 250/353 X |
| 4,058,726 | 11/1977 | Pascheday et al. | 250/353 |
| 4,081,680 | 3/1978 | Keller | 250/353 X |
| 4,179,691 | 12/1979 | Keller | 340/567 |
| 4,258,255 | 3/1981 | Guscott | 250/342 |
| 4,263,585 | 4/1981 | Schaefer | 340/567 |

*Primary Examiner*—John W. Caldwell, Sr.
*Assistant Examiner*—Joseph E. Nowicki
*Attorney, Agent, or Firm*—Jackson, Jones & Price

[57] ABSTRACT

An improved infrared detector system includes a pair of thin film thermopile sensing elements that receives reflected energy from aspheric reflectors that are designed to provide optimum energy resolution. An absorbing coating can be placed above the sensors and extending beyond the periphery to improve the signal to noise ratio. A high gain low noise D.C. amplifier is coupled to the output of the infrared sensing elements while a high pass amplifier and low pass amplifier are designed to pass an amplified signal in the frequency range from approximately 0.2 Hz to 15 Hz. Finally, a combined peak detector and time dependent integrator summing amplifier circuit provides an enabling predetermined threshhold detection gate that requires either a predetermined large signal level or a multiple of small electrical signals within a preselected interval to produce an alarm enabling signal.

19 Claims, 5 Drawing Figures

INFRARED DETECTOR SYSTEM

BACKGROUND OF THE INVENTION

1. Field of the Invention

The present invention pertains to an improved infrared detector system capable of detecting an intruder upon reception of emitted infrared energy from his body. More particularly, the present invention provides an improved optical reflection system and circuit for processing the reflected energy to provide improved sensitivity and eliminate false alarms.

2. Description of the Prior Art

Infrared detection systems are well known in the prior art and a number of alternative systems are available commercially. Frequent problems have occurred with regard to the sensitivity of infrared systems and their ability to discriminate between actual human intruders and various changes in ambient background conditions. As a general rule, infrared sensors detect a change in IR radiation, and it is frequently necessary in the prior art for the target area to be relatively temperature stable. Sudden changes in room temperature, incident light, and room convection currents can cause false alarms. The prior art has also attempted to increase the scan range of the infrared detectors, both to maintain sensitivity and to lower manufacturing costs by preventing duplication of expensive component parts. Problems, however, have occurred in loss of sensitivity with extended scan ranges.

The following examples of patent literature are provided to disclose both the background of the present invention and prior art detection systems in this field; U.S. Pat. No. 3,036,219, U.S. Pat. No. 3,475,608, U.S. Pat. No. 3,480,775, U.S. Pat. No. 3,493,953, U.S. Pat. No. 3,524,180, U.S. Pat. No. 3,631,434, U.S. Pat. No. 3,703,718, U.S. Pat. No. 3,839,640, U.S. Pat. No. 3,928,843, and U.S. Pat. No. 3,958,118.

The prior art is still seeking to provide an optimized infrared passive detection system that can be manufactured at relatively economical cost while improving both the sensitivity of the system and the elimination of spurious alarm signals.

SUMMARY OF THE INVENTION

The present invention provides an infrared detector system having both an improved optical reflection system and signal processing circuitry. A pair of infrared sensing elements are positioned adjacent to a plurality of aspheric reflector segments that partition an object field of view into several discrete regions. Each aspheric reflector observes a different region and is focused, for a point on its optical axis, in a plane containing the infrared sensing elements and at a common focal point between the two infrared sensing elements. The aspheric reflector segments provide an improved image resolution with a minimal amount of the image aberration that have been experienced by the prior art.

The respective infrared sensing elements are biased to provide a respective first and second electrical signal of opposite polarity which will be subsequently processed when they are from a source that irradiates the sensing elements noncoincidentally. Noncoincident electrical signals from the infrared detector elements, such as thin film thermopile elements, are inputed to a high gain low noise operational amplifier. The output from this D.C. amplifier is filtered through a high pass amplifier with gain peaking which only passes alternating current signals above 0.2 Hertz. The output signals from the high pass amplifier are further filtered by a low pass amplifier which provides an output signal falling within a frequency range of 0.2 Hertz to 15 Hertz. This range corresponds to the frequency range of a moving human intruder through the object field of the detector system. This band pass signal is inputed to a peak detector and time dependent integrator summing amplifier which drives a detector. It provides an alarm on a single large signal or the integral of multiple smaller signals.

The detector elements may include an active area such as an antimony and bismuth junction covered with an extended energy absorbing carbon black paint, for example, having three times the surface area of the active element. The extended surface area of carbon black provides a slower acceptable response time with a twofold signal to noise improvement.

Finally, an alarm driver circuit is utilized to respond to the output signal from the integrating amplifier and indicate the presence of an intruder, for example by an alarm and/or an indication of the presence of an intruder at a remote monitoring station.

The objects and features of the present invention which are believed to be novel are set forth with particularity in the appended claims. The present invention, both as to its organization and manner of operation, together with further objects and advantages thereof, may best be understood by reference to the following description, taken in conjunction with the accompanying drawings.

DESCRIPTION OF THE PREFERRED EMBODIMENT

The following description is provided to enable any person skilled in the optical and electronic industry, and more particularly, to people skilled in the electronics security field, to make and use the invention and sets forth the best modes contemplated by the inventors of carrying out their invention. Various modifications, however, will remain readily apparent to those skilled in the art, since the generic principles of the present invention have been defined herein specifically to provide a relatively economical and easily manufactured infrared detector system.

Figure 1:
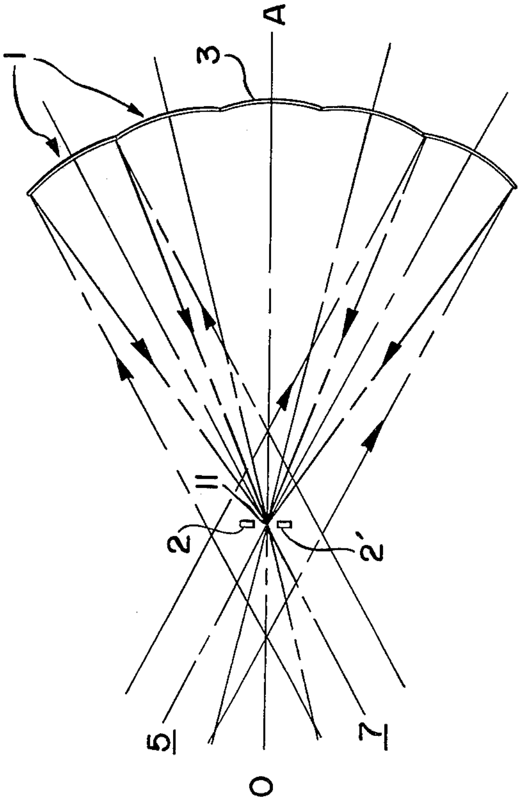
FIG. 1 discloses a schematic drawing of an aspheric optical reflector system of the present invention.

Referring to FIG. 1, a schematic plan view of the optical system for a preferred embodiment of the present invention is disclosed. A plurality of aspheric reflector segments 1 are assembled into a curvilinear array 3. Each aspheric segment is about two inches in height with a focal length of about 1.35 inches and provides a specific zone of coverage or field of view which cumulatively define a protected area covered by the infrared detector system of the present invention. Thus, ray traces are disclosed for respective separate fields of view or zones, e.g., 5 and 7 associated with individual aspheric segments. For example, each segment is separated radially by 15° and provides a total field of view of 75°. Each segment subtends an individual field of view of 3.5°. The total full view of the detector is accordingly made up of such individual zones or becomes separated 15° from each adjacent zone.

Infrared sensors or detectors 2 and 2' are schematically disclosed in FIG. 1 to illustrate their relationship to a common focal point 11 of each of the aspheric reflector segments 1. Thus, for example, a point on the optical axis, OA, would be focused on the common focal point 11 that is positioned between the sensing elements 2 and 2' which is basically in the same plane as the sensing elements. Likewise, a point object on each of the other optical axes within the zones of each of the aspheric segments that make up the reflector array 3 are also focused on the common focal point 11. The preferred embodiment of the present invention utilizes five reflective aspheric segments that are identical in configuration with an aspheric surface of revolution for the array 3. The aspheric surface of revolution can be parabolic in its simplest form, but preferably is a general aspheric configuration. By providing this unique optical reflecting system, a substantially higher image quality is produced with a resulting energy gain greater than has heretofore been available. The particular aspheric segment reflector surfaces minimize the discrepancy between the tilted image planes of the side reflector segments and the plane of the sensing elements and also spherical aberrations. The optics is designed for optimum energy resolution as opposed to conventional image resolution optics, that is, aberrations that do not spread the energy distribution beyond the effective receptor surface of the sensing elements are acceptable.

Since the design of an infrared detector system of the present invention relies upon the individual detectors to be radiated noncoincidentally to provide an electrical signal for processing (as will be described subsequently), the improved imaging characteristics of this reflector system can contribute significantly to greater sensitivity and selectivity of the overall system.

Figure 3:
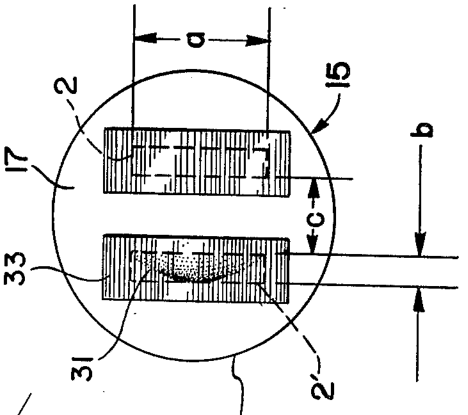
FIG. 3 discloses one embodiment of sensor geometry.

Referring to FIG. 3, and more particularly detector 2', an image of one point on the leading edge of an intruder is imaged by the reflector system on the plane of the detector and discloses the spot diagram representation of the energy distribution of the image of the point object. The particular design of the aspheric reflector segment takes into consideration the geometric configuration of the detector and distributes the energy in an elongated configuration compatible with the rectangular configuration of the detector. The spot diagram disclosed is for an image reflected by an outer reflector segment.

As can be determined from FIG. 3, a thin film thermopile detector sensing element has been modified to have an increased effective surface area of carbon black extending beyond the detector active area 31 of the sensing elements onto a nonconductive peripheral area 33 that is approximately twice as large. By providing this increased carbon black area, it has been found that the signal to noise ratio is increased by a factor of two. Each active element of the detector can comprise approximately 26 antimony and bismuth junctions. The increased surface area of carbon black does slow the response of the sensing elements, but within the design parameters of the present invention this is not an impediment.

The respective planes of the detectors will be tilted at different angles depending upon the off axial position of the individual aspheric segments. The aspheric contour is accordingly chosen to minimize the image degradation for all segments of the imaging system. In this regard, the aspheric surface can be defined by the following equation for any single reflective segment;

$$Y = \frac{CX^2}{1 + \sqrt{1 - (1 + K)\, C^2X^2}} + AX^4$$

wherein, $$-0.375 \leqq C \leqq -0.365$$

$$-0.005 \leqq A \leqq +0.005$$

$$-1.10 \leqq K \leqq -0.90$$

Figure 2:
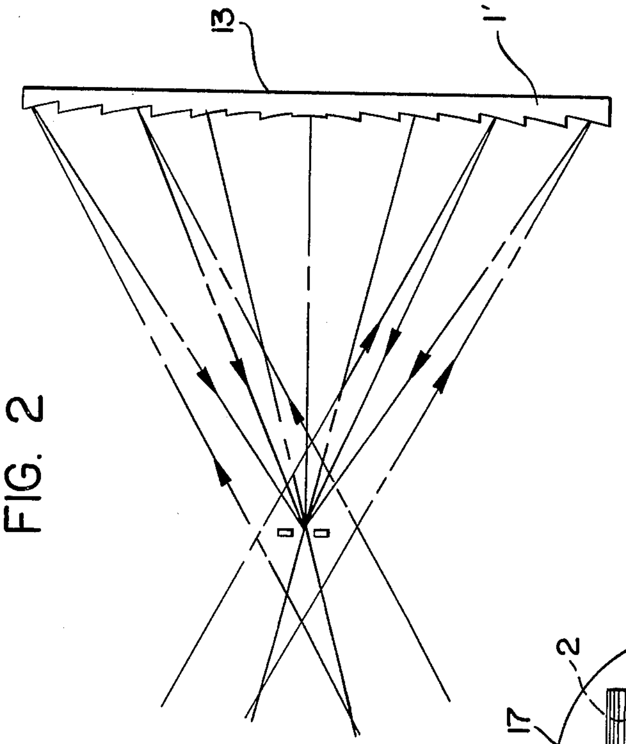
FIG. 2 discloses a modification of the present invention with a fresnel reflector system.

Referring to FIG. 2, an alternative embodiment of the present invention is disclosed wherein an aspheric fresnel array 13 replaces the optical array 3 of FIG. 1. As can be seen from FIG. 2, a section 1' of the fresnel reflector 13 corresponds to the aspheric segment 1 to provide the same zone of coverage or field of view that was provided by the individual aspheric segment 1 disclosed in FIG. 1. Both the aspheric optical array 3 of FIG. 1 and the aspheric fresnel reflector 13 can be advantageously manufactured by a plastic injection molding technique with appropriate reflective surface coating, or stamped from highly reflective ductile metal sheets. Thus, the optical system of the present invention can be relatively inexpensively manufactured while significantly improving the image resolution capabilities to insure a highly selective and sensitive infrared detector system.

The geometry of the field of view can be changed by appropriate dimensional changes in both the detector size and the positioning or location of the reflective segments of the optical system. The preferred embodiment of the present invention utilizes approximately 2 inch high by 0.5 inch wide mirror segments which provide collective field of view or zone of coverage of approximately 75° with sensitivity exceeding a distance of 50 feet from the detectors 2 and 2'.

Referring to FIG. 3, a detector assembly 15 can comprise two spaced apart infrared sensing elements 2 and 2' such as thin film thermopiles of the type sold by Horiba Corporation of Irvine, Calif., as Models TP-301 and TP-302. Pyroelectric and thermistor devices could also be utilized as sensing elements within the basic principles of the present invention. The range of detector element geometrical parameters for the preferred embodiment disclosed in FIG. 3 are as follows in millimeters:

$$1.8 \leqq a \leqq 2.2$$

$$0.04 \leqq b \leqq 0.6$$

$$0.05 \leqq c \leqq 0.8$$

A spectral filter window 17 can be provided in the detector assembly 15 to extend across the respective infrared sensing elements 2 and 2'. Preferably, the filter window 17 is an anti-reflection coated germanium element which limits transmission to the infrared range.

Figure 4:
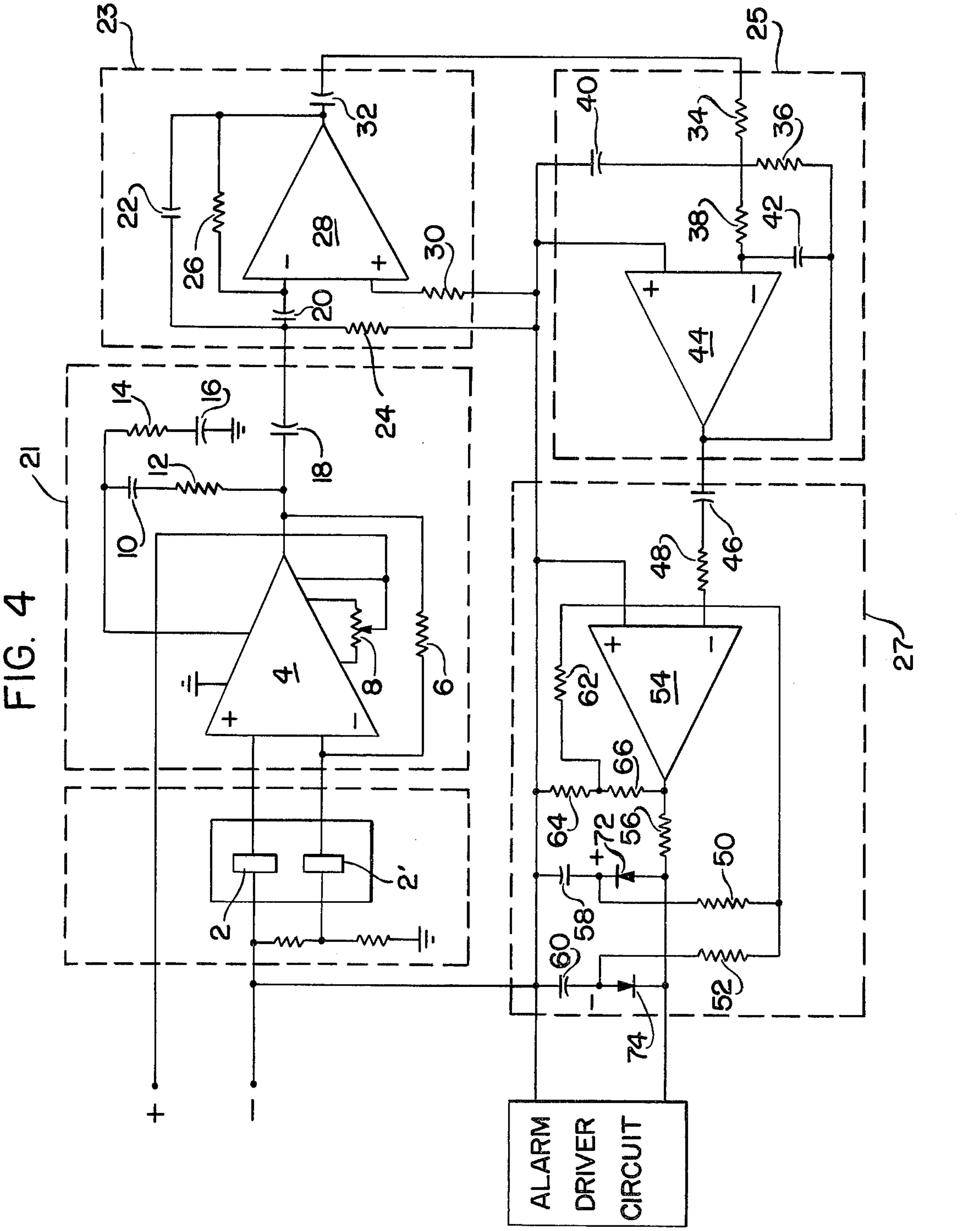
FIG. 4 is a diagrammatic representation of the signal processing electronics.

The general functioning of the electronic signal processing circuit will now be described with reference to FIG. 4.

A constant voltage source such as a voltage/current regulator of a conventional design is connected directly to one input terminal of an infrared sensor 2 and is connected through a resistor to the input terminal of a second infrared sensor 2'. The output voltage of each infrared sensor 2 and 2' is proportional to the quantity of radiation impinging upon the sensing element. These two infrared sensing detectors 2 and 2' interface directly with the reflection optical system and comprise the detector means of the infrared detector system. These infrared sensor elements are capable of generating electrical signals of opposite polarity when exposed to infrared energy.

An intruder, transmitting an infrared image, and moving noncoincidentally across the field of view of the two infrared sensor elements, will produce a negative pulse from infrared sensor 2' and a positive pulse from infrared sensor 2. The sequence of positive and negative or negative and positive pulses will depend on the direction the intruder moves across the field of view. The positive and negative pulses are generated at the input to the D.C. operational amplifier 21. Since the infrared sensing elements are low impedance thin film thermopile elements, there is provided optimum impedance matching between the sensor elements and the amplifier 21. The thin film thermopile elements provide significantly higher signal to noise ratios than possible with a thermistor or pyroelectric sensor elements connected to a field effect transistor.

Figure 5:
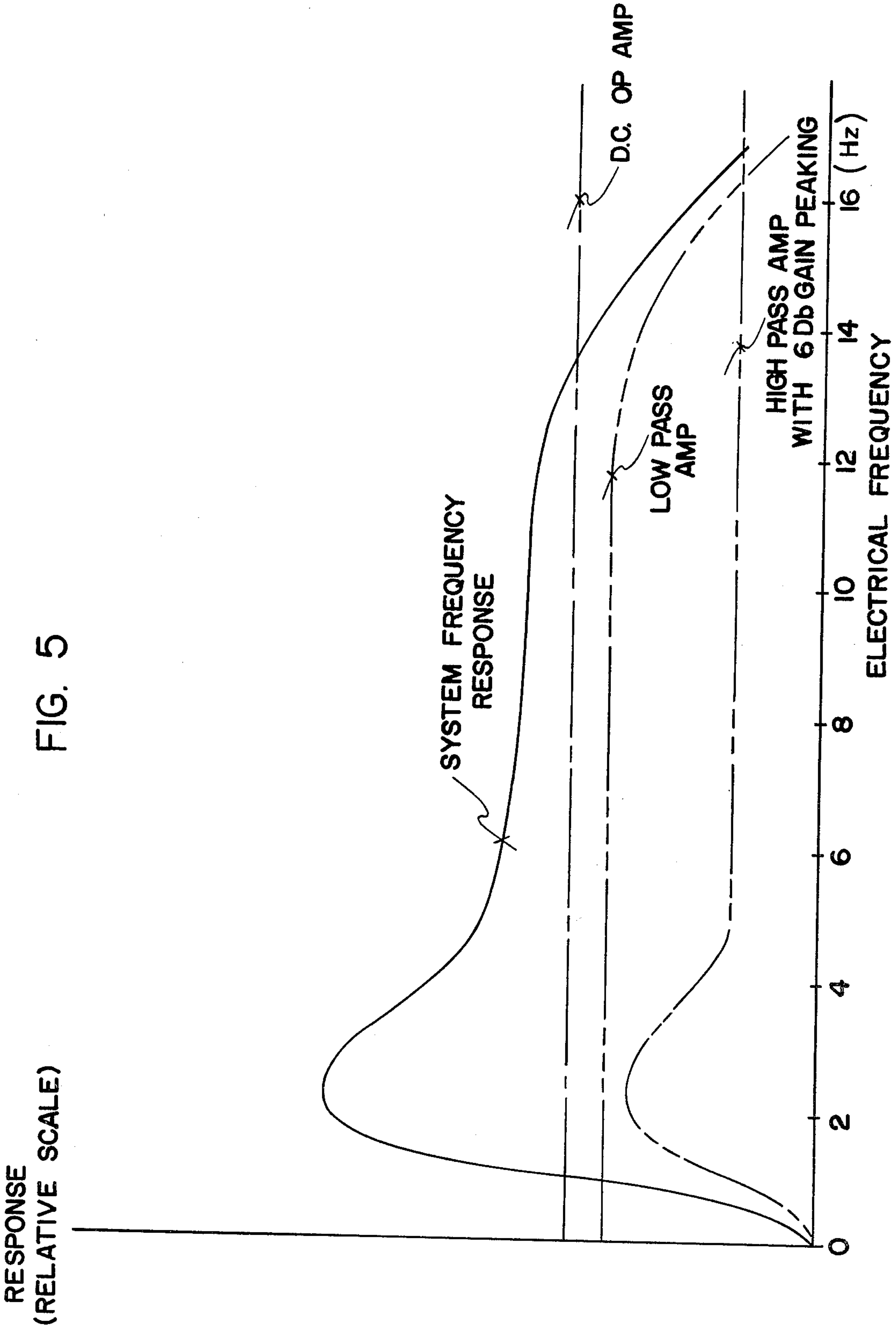
FIG. 5 discloses response versus frequency curves for the present invention.

The D.C. operational amplifier 21 can be of the type manufactured by National Semiconductor Corporation and sold under the Model No. LM 725CN. This operational amplifier 21 has a gain of about 2000 and exhibits a flat response from 0 Hz to more than 50 Hz as shown in FIG. 5. If both of the sensors are simultaneously irradiated, there is no net pulse to the operational amplifier 21 because the positive pulse from sensor 2 cancels the negative pulse from sensor 2'. If both elements are simultaneously irradiated, there will not be any false alarm due to a spurious reflection or change in the ambient condition of the background.

A high pass amplifier circuit 23 serves to reject the D.C. bias so that only A.C. pulses above 0.2 Hz pass to a subsequent low pass filter amplifier circuit 25. The high pass amplifier is of the type manufactured by National Semiconductor Corporation and sold as Model No. LM 324. This amplifier has a gain exceeding 10 with a frequency response as disclosed in FIG. 5. The use of low frequency gain peaking provides better response to low frequencies associated with slowly moving objects. The low pass amplifier is also manufactured by National Semiconductor Corporation as Model No. LM 324. The high pass and low pass amplifiers provide a filter means generating an amplifier signal falling in the range of 0.2 Hz to 15 Hz. This signal is then inputed into a peak detector and time dependent summing amplifier circuit 27, again using a Model No. LM 324 amplifier from National Semiconductor Corporation. Circuit 27 serves both as a detector and a time dependent integrator that requires one of a large signal associated with a human intruder and/or subsequent smaller signals arriving within a preselected interval to produce an alarm enabling signal. Circuit 27 provides a large output from several noncoincidental smaller signals arriving within a preselected interval to produce an alarm enabling signal. Circuit 27 provides a large output from several noncoincidental smaller signals, each smaller signal being insufficient to produce an alarm signal alone. Thus, multiple small signals within the time gate period must be provided by the sensors to provide an alarm. The alarm enabling signal can then be addressed to a driver circuit in an alarm of a standard design.

Thus, the test conditions that are provided by the signal processing circuitry of the present invention can be summarized as follows. Infrared energy must be incident on one or the other of the IR sensor elements to produce an output from the D.C. operational amplifier circuitry 21. Objects that are moving slower or faster than a human intruder will generate signal rise times that are outside the high and low filter amplifier pass bands and will not be sensed. Thus, the enabling electrical signals must be within the frequency range of 0.2 Hz to 15 Hz.

Infrared emitting objects that are smaller than a human intruder will produce amplified signals at the peak detector summing amplifier that will not exceed a preselected threshold necessary to enable the alarm. The time dependent integration performed by circuit 27 requires that human intruder must be sensed by both detectors within a preselected interval wherein the signal from the intruder must be large enough on one of the detectors in order that the integrator summing amplifier will develop a large enough voltage to enable an alarm signal. Finally, the spectral radiance of the emitting object must be with a limited spectral pass band associated with the human body. Accordingly, radiant objects such as solar reflections, room lights, slow temperature changes, etc., will not have energy in the pass band of the detector system and will not be sensed by the present invention. Additionally, environmental infrared energy sources that generate equal and opposing signals at the same time on the detectors, will cancel each other out and not produce an enabling signal to the operational amplifier 21.

A more detailed description of the signal processing circuitry of the present invention will hereinafter be described with reference to FIG. 4.

The dual element thermopile detectors 2 and 2' are coupled to the two inputs of a very low noise transistor input operational amplifier 4 that provides very good impedance matching and low noise amplification. The gain of the operational amplifier 4 is set by the resistor 6 and the resistance of the sensing elements 2. A resistor pot 8 balances out the initial D.C. error of the operational amplifier 4. The combination of the capacitors 10 and 16 and the resistors 12 and 14 provide the frequency compensation components of the low noise operational amplifier 4. The output of the operational amplifier is filtered by passing the signal through two capacitors 18 and 20 mounted in series to the negative input of operational amplifier 28. The two capacitors 18 and 20 and the capacitor 22 in combination with resistors 24 and 26 set the pass frequency, the gain, and the peaking frequency of the operational amplifier 28. The pass frequency is set at over 0.2 Hz, the gain is 10, and the peaking is about 6 db. The resistor 30 connected to the positive input of the operational amplifier 28 balances and corrects the D.C. error of operational amplifier 28. The capacitor 32 connected to the output of the operational amplifier 28 blocks D.C. voltage and also serves as a high pass capacitor above 0.1 Hz for the next stage of filtering.

The combination of the resistors 34, 36 and 38, and capacitors 40 and 42 provide low pass, filter, feed back, gain setting, and roll-off, to the low pass operational amplifier 44. The gain is 10 with a roll-off of 15 Hz.

The capacitor 46 at the output of the low pass amplifier 44 serves as a D.C. isolating capacitor for the time dependent summing amplifier 54. The ratio of the resistors 48, 50 and 52 sets a gain of 2 for the time dependent summing amplifier 54. The resistor 56 at the output of the operational amplifier 54 charges the two capacitors 58 and 60, through the two diodes 72 and 74, which also isolate the two capacitors from the operational amplifier 54. The two resistors 50 and 52 also provide feed back to the input of operational amplifier 54 for the summing, and also set the R.C. constant. In conjunction with capacitors 58 and 60, the resistors 62, 64 and 66 set the gain of operational amplifier 54 for low level signals, so that noise input does not cause summing. The gain 20 is the ratio of the resistor 64 and the resistor 66 times the ratio of the resistor 62 to the resistor 48.

The circuit 27 functions as follows: with no signal, input capacitors 58 and 60 are discharged and the summing amplifier 54 output is zero. If the amplifier input signal goes to a predetermined small positive value, as determined by the particular sensitivity level selected for the infrared detector system, for example +0.5 volt, the amplifier 54 output is forced to −1 volt and capacitor 60 is charged to a −1 volt. When the amplifier 54 input returns to zero, the −1 volt charge on capacitor 60 forces the amplifier 54 output to +1 volt and charges capacitor 58 to +1 volt. If the amplifier 54 input subsequently goes to a predetermined small negative value, for example −1 volt, the amplifier 54 output is forced to +1 volt and capacitor 58 is charged to +2 volts. When the amplifier 54 output returns to zero, capacitor 60 is then charged to −2 volts in a similar manner. Therefore, circuit 27 integrates a sequence of positive or negative pulses. The resistors 52 and 50 discharge the respective capacitors 60 and 58 at a preselected rate and if the sequence of charging is sufficiently fast within the R.C. constant to accumulate a capacitor charge to a predetermined threshhold level, an enabling signal will be generated to produce an alarm signal. Thus, if two sufficiently large signals of opposite polarity arrive within a predetermined time gate period and are sufficiently summed to a threshhold level, then a time dependent voltage develops to produce an alarm. Alternatively, if a single threshhold level large voltage, e.g., 2 volts, is produced, then an alarm is also activated.

Although the foregoing has been a description of a specific embodiment of the disclosed invention, modifications and changes thereto can be made by persons skilled in the art without departing from the spirit and scope of the invention as defined by the following claims.

What is claimed is:

1. An infrared detector system comprising;

at least a pair of spaced apart infrared sensing elements capable of generating respective first and second electrical signals;

a plurality of reflective surfaces subtending respective different object fields of view, about a respective optical axis, each reflective surface having a focal point positioned on its optical axis between the respective infrared sensing elements and reflecting optimum energy resolution of an image configuration compatible to the sensing element configuration whereby movement of an infrared emitting object will produce a sequence of electrical signals from the infrared sensing elements; and means for processing the electrical signals to produce an alarm signal in response to predetermined enabling conditions.

2. The invention of claim 1 wherein the reflective surfaces are aspherical.

3. The invention of claim 1 wherein each reflective surface is inclined relative to its adjacent reflective surface so that different regions of the object fields of view can be imaged onto the infrared sensing elements, each reflective surface having a common focal point between the infrared sensing elements.

4. The invention of claim 1 wherein each reflective surface is substantially identical and can be defined by the following equation:

$$Y = \frac{CX^2}{1 + \sqrt{1 - (1 + K)\,C^2X^2}} + AX^4$$

wherein;

$$-0.375 \leqq C \leqq -0.365$$

$$-0.005 \leqq A \leqq +0.005$$

$$-1.10 \leqq K \leqq -0.90$$

5. The invention of claim 1 wherein the reflective surfaces are on an aspheric fresnel element.

6. The invention of claim 1 wherein the infrared sensing elements are low impedance thin film thermopile elements.

7. The invention of claim 6 wherein the means for processing the electrical signals include a high gain direct current operational amplifier directly connected to the output of the thermopile elements.

8. The invention of claim 1 wherein the means for processing the electrical signals include a filter circuit having a high pass amplifier and a low pass amplifier to pass an amplified signal in the frequency range of 0.2 Hz to 15 Hz.

9. The invention of claim 1 wherein the means for processing the electrical signals include a combined peak detector and time dependent integrator summing amplifier circuit means to provide an alarm signal, the summing amplifier circuit means providing an enabling predetermined threshhold detector gate that requires one of a predetermined large signal level and a multiple of smaller electrical signals within a preselected interval.

10. The invention of claim 1 wherein the sensing elements are thin film thermopiles having active and inactive surfaces with an infrared energy absorbing coating layer extending over both surfaces to provide an increased signal to noise ratio at a slower response time than a conventional thin film thermopile.

11. The invention of claim 10 wherein the inactive surface area is coated with approximately twice the area coating of the infrared energy absorbing layer as the active surface area.

12. The invention of claim 1 wherein the infrared sensing elements have a rectangular configuration and are spaced horizontally apart from each other, and the respective reflective surfaces can optically an image of a human being that is non-coincidental with both sensors, the reflected image being elongated in the vertical plane to match the rectangular elongated configuration of the image sensor.

13. An infrared detector system comprising:

detector means including at least a pair of infrared sensing elements capable of generating respective first and second electrical signals of opposite polarity;

reflecting means including a plurality of aspheric reflector segments that partition the object field of view into discrete regions, each reflector segment subtending a different region and focusing incident infrared energy onto the detector means with minimal image aberration;

circuit means for processing electrical signals from the detector means including a high gain low noise D.C. amplifier coupled to the output of the infrared sensing elements, a high pass amplifier and low pass amplifier coupled respectively in series to the output of the D.C. amplifier to pass an amplified signal in the frequency range of approximately 0.2 Hz to 15 Hz and a combined peak detector and time dependent integrator summing amplifier circuit receiving the signal from the low pass amplifier to provide an enabling predetermined threshhold detection gate that requires one of, a predetermined large signal level and a multiple of small electrical signals within a preselected interval, to produce an alarm enabling signal, and means responsive to the alarm signal to indicate the presence of an intruder.

14. The invention of claim 13 wherein the aspheric reflector segments have a substantially identical configuration and can be defined by the following equation:

$$Y = \frac{CX^2}{1 + \sqrt{1 - (1 + K)\,C^2X^2}} + AX^4$$

wherein;

$$-0.375 \leqq C \leqq -0.365$$

$$-0.005 \leqq A \leqq +0.005$$

$$-1.10 \leqq K < -0.90$$

15. The invention of claim 13 wherein the reflective segments are on an aspheric fresnel element.

16. The invention of claim 13 wherein each reflective segment is inclined relative to its adjacent reflective segment so that different regions of the object fields of view can be imaged onto the infrared sensing elements, each reflective segment having a common focal point between the infrared sensing elements.

17. The invention of claim 13 wherein the sensing elements are thin film thermopiles having active and inactive surfaces with an infrared energy absorbing coating layer extending over both surfaces to provide an increased signal to noise ratio at a slower response time than a conventional thin film thermopile.

18. The invention of claim 17 wherein the inactive surface area is coated with approximately twice the area coating of the infrared energy absorbing layer as the active surface area.

19. The invention of claim 16 wherein each reflective segment subtends an individual field of view of 3.5°.

* * * * *